United States Patent
Abusorrah et al.

(10) Patent No.: US 10,970,650 B1
(45) Date of Patent: Apr. 6, 2021

(54) AUC-MAXIMIZED HIGH-ACCURACY CLASSIFIER FOR IMBALANCED DATASETS

(71) Applicant: King Abdulaziz University, Jeddah (SA)

(72) Inventors: Abdullah Abusorrah, Jeddah (SA); Yusuf Al-Turki, Jeddah (SA); Mengchu Zhou, Newark, NJ (US); Siya Yao, Shanghai (CN)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/876,574

(22) Filed: May 18, 2020

(51) Int. Cl.
*G06N 20/00* (2019.01)
*G06F 16/28* (2019.01)

(52) U.S. Cl.
CPC .......... *G06N 20/00* (2019.01); *G06F 16/285* (2019.01)

(58) Field of Classification Search
None
See application file for complete search history.

(56) References Cited

PUBLICATIONS

Liu, Ty, "EasyEnsemble and feature selection for imbalance data sets", 2009 Int'l Joint Conf. on Bioinformatics, Systems Biology, and Intelligent Computing, IEEE, pp. 517-520. (Year: 2009).*

Smith, M. and T. Martinez, "Improving classification accuracy by identifying and removing instances that should be misclassified", Proc. Int'l Joint Conf. on Neural Networks, Jul. 31-Aug. 5, 2011, pp. 2690-2697. (Year: 2011).*

Tallón-Ballesteros, A.J., and J.C. Riquelme, "Deleting or keeping outliers for classifier training?", 2014 Sixth World Congress on Nature and Biologically Inspired Computing (NaBIC 2014), IEEE, 2014, pp. 281-286. (Year: 2014).*

AKARTE: "Predictive Maintenance of Air Pressure System using Boosting Trees: A Machine Learning Approach", Vishwakarma Institute of Technology, Department of Industrial Engineering and Operations Research.

(Continued)

*Primary Examiner* — Vincent Gonzales
(74) *Attorney, Agent, or Firm* — W&C IP

(57) ABSTRACT

An AUC-maximized high-accuracy classification method and system for imbalanced datasets integrates an under-sampling-and-ensemble strategy, a true-outliers-removing strategy and a fake-outliers-concealing strategy, with the hope to effectively and robustly enhance both the AUC and the accuracy metrics in imbalanced classification. Applying under-sampling to construct multiple sub-datasets and assembling classification results of multiple classifiers greatly decline the risk of misclassification and lead to highly accurate and robust results in imbalanced classification task. Moreover, this invention pays attention to detect and identify extremely hidden outliers in a sub-dataset which includes a sub-majority dataset and the entire minority dataset. In this way, more hidden outliers can be located and thus exert less influence on the decision boundary, which contributes to both high AUC and accuracy. Furthermore, this invention proposes to conceal fake outliers when building decision boundary, which can achieve a higher classification accuracy of the majority class without changing that of the minority class.

4 Claims, 10 Drawing Sheets

(56) References Cited

PUBLICATIONS

Chawla et al: "SMOTE: Synthetic Minority Over-sampling Technique", Journal of Artificial Intelligence Research, vol. 16, pp. 321-357, 2002.

Diez-Pastor et al: "Random Balance: Ensembles of variable priors classifiers for imbalanced data", Knowledge-Based Systems, vol. 85, pp. 96-111, 2015.

Ertekin et al: "Learning on the Border: Active Learning in Imbalanced Data Classification", 2007.

Han et al: "Borderline—SMOTE: A New Over-Sampling Method in Imbalanced Data Sets Learning", 2005.

Kang et al: "A Noise-Filtered Under-Sampling Scheme for Imbalanced Classification", IEEE Transactions on Cybernetics, vol. 47, No. 12, pp. 4263-4274, Dec. 2014.

Kang et al: "A Distance-Based Weighted Undersampling Scheme for Support Vector Machines and its Application to Imbalanced Classification", IEEE Transactions on Neural Networks and Learning Systems, vol. 29, No. 9, pp. 4152-4165, Sep. 2018.

Maldonado et al: "Imbalanced data classification using second-order cone programming support vector machines", Pattern Recognition, vol. 47, pp. 2070-2079, 2014.

Nguyen et al: "Boderline Over-sampling for Imbalanced Data Classification", Fifth International Workshop on Computational Intelligence & Applications, pp. 24-29, 2009.

Oh et al: "Ensemble Learning with Active Example Selection for Imbalanced Biomedical Data Classification", IEEE/ACM Transactions on Computational Biology and Bioinformatics, vol. 8, No. 2, pp. 316-325, 2011.

Peruffo: "Improving predictive maintenance classifiers of industrial sensors' data using entropy. A case study.", National College of Ireland, 2018.

Rafsunjani et al: "An Empirical Comparison of Missing Value Imputation Techniques on APS Failure Prediction", I.J. Information Technology and Computer Science, vol. 2, pp. 21-29, 2019.

Ranasinghe et al: "Generating Real-valued Failure Data for Prognostics Under the Conditions of Limited Data Availability", 2019.

Shao et al: "An efficient weighted Lagrangian twin support vector machine for imbalanced data classification", Pattern Recognition, vol. 47, pp. 3158-3167, 2014.

\* cited by examiner

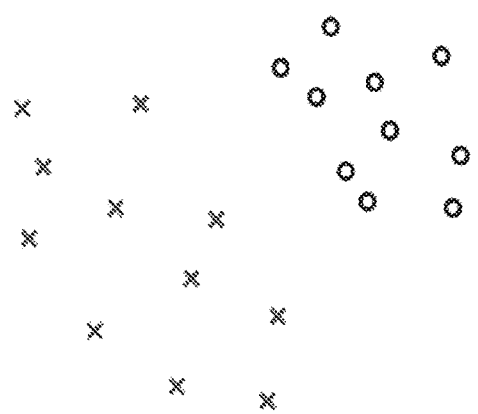 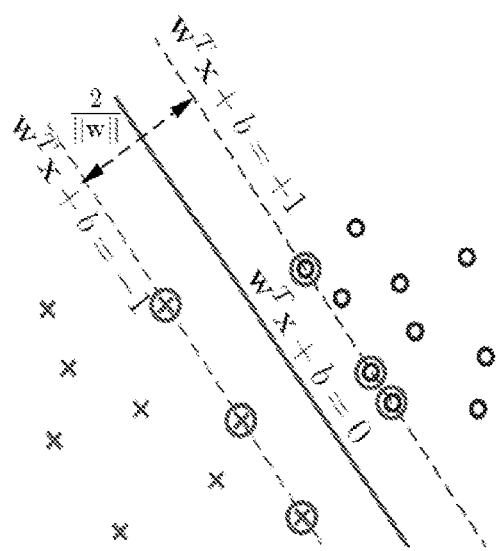
FIGURE 6A     FIGURE 6B
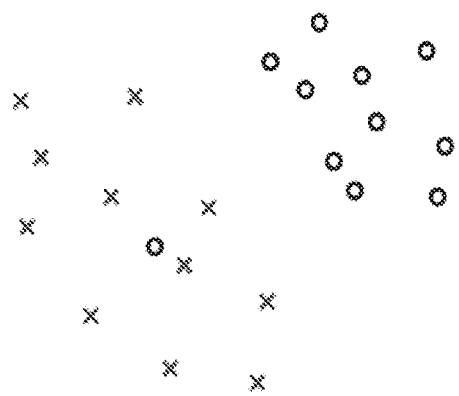 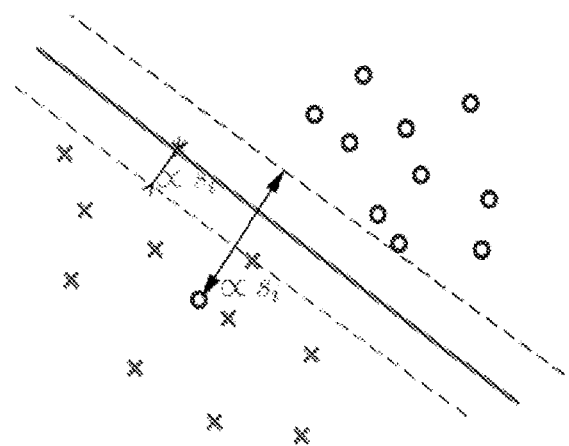
Figure 7A     FIGURE 7B

AUC-MAXIMIZED HIGH-ACCURACY CLASSIFIER FOR IMBALANCED DATASETS

DESCRIPTION OF THE INVENTION

Field of the Invention

The present invention is generally directed to the field of machine learning and, more particularly, to an AUC-maximized high-accuracy classification method and system for imbalanced datasets.

BACKGROUND OF THE INVENTION

It is widely known that developing a machine learning based system using imbalance data samples is not straightforward. Based on the literature of machine learning research, imbalanced data can be handled by: techniques dealing at the data level (over-sampling or under-sampling) and techniques dealing at the classifier level by modifying the algorithms to suit the imbalanced scenario.

Random under-sampling of the majority-class samples, and over-sampling by duplication of the minority-class samples are two of the simplest ways of dealing with the classification of imbalanced datasets. However, they also produce unwanted effects such as over-fitting or information loss by duplicating or deleting examples respectively, as described by Han et al. [1]. A hybrid technique combines both oversampling and under-sampling. Synthetic Minority Oversampling Technique (SMOTE), as described by Chawla et al. [2], is another frequently used technique where instances of the minority class are synthetically created between samples of the class and their neighbors. Borderline-SMOTE [1] is a modification of the SMOTE technique, where oversampling of the minority-class is performed only for the samples which are close to the decision boundary. This method considers a minority-class instance to be qualified for oversampling with the SMOTE technique if more than a half of its m nearest neighbors come from the majority class.

Costa and Nascimento [3] use weighted data classifiers to deal with class imbalance. Class-specific weights were incorporated in Logistic Regression (Log R) and Support Vector Machine (SVM) classifiers. The weights assigned to the classes were inversely proportional to the number of samples in a class. In the case of random forest and K-Nearest Neighbors (KNN) classifiers, the authors shifted the threshold for predicting a sample. The threshold was shifted according to the proportion of samples in each class. For example, using KNN, if a minority-class sample was among the 60 nearest neighbors, it was classified as positive. In order to deal with missing data, soft-impute, a form of Expectation Maximization based imputation, was employed. Results are reported in terms of miss-classification cost, false positive percentage, and false negative percentage.

Peruffo [4] investigated the use of different entropy measures as indicators of node impurity, in order to decide splitting in a decision tree classifier. The author argued that for imbalanced data, alternative definitions of entropy (instead of traditional Shannon's definition) lead to better measures for splitting. This can lead to improvement in minority-class precision at the expense of majority-class precision. The author tested the entropy measures on the public Air Pressure System dataset. Accuracy, false negatives, and false positives were used as the performance measures.

Rafsunjani et al. [5] investigated five different imputation techniques (Expectation Maximization, Mean Imputation, Soft Impute, Multiple Imputation by Chained Equation, and Iterative Singular Value Decomposition) in conjunction with five different classifiers: KNN, Naive Bayes, Gradient Boosted Tree, Random Forest, and SVM. Their results indicated that Multiple Imputation by Chained Equation was the most effective imputation technique, and random under-sampling was the most effective technique to deal with imbalanced data. In addition to the accuracy, true negatives, false positives, false negatives, and true positives were used as the performance measures.

Ranasinghe and Parlikad [6] investigated the use of Conditional Generative Adversarial Network (CGAN) for generating artificial samples of the minority class. They used the CGAN by sampling from joint distributions of auxiliary information related to failures and noise. APS failure dataset for Scania trucks were used for the experimentation. The authors generated 2000 extra samples for the minority class to be used during training. True positives, true negatives, false positives, and false negatives were used as the performance measures apart from the misclassification cost.

Akarte and Hemachandra [7] employ weighted samples by assigning more weight to the samples of the minority class. The weight was set based on the ratio of the samples of the positive and the negatives classes in the training set. The hyper-parameters were optimized using cross-validation results. Samples with over 70% missing values were removed. Other missing values in a feature were replaced with feature median. True positives, true negatives, false positives, false negatives, precision, recall, F1-scores were used as measures apart from the misclassification cost.

Ertekin et al. [8] considered active learning with online SVM to deal with imbalanced data. Online SVM learns incrementally by adding samples one at a time to the training set. The sample to be added to the training set at a given iteration is selected using the active learning strategy. 59 data points are randomly sampled, and the closest sample to the current boundary is added to the training set. An early stopping criterion is used to stop the training. It is based on the idea that if the number of support vectors stabilizes implying that all the possible support vectors have been selected, then the training can stop.

Nguyen et al. [9] presented the idea of oversampling the minority class only at the borderline between the class samples in order to deal with classification for imbalanced data. Their justification was that the samples that lie close to the border are more important for the classification problem. Hence oversampling should be at the borderline instead of using all the minority-class samples. The presented method was found to be effective when the overlap between the classes is low. Ensemble of under-sampled classifiers is another technique to deal with the imbalanced data (e.g., [10]). As different batches of under-sampled datasets are created, an ensemble seems to perform more robustly as compared to a single classifier. Oh et al. [10] presented an incremental technique based on randomly selecting a balanced subset from the complete data, and then iteratively adding 'useful' samples to the training set. The usefulness of a sample is determined by improvement in the information gain of the classifier by adding that sample to the existing subset of training examples. Diez-Pastor [11] created an ensemble of classifiers termed as RB-Boost. The idea was to combine AdaBoost with random sampling. Here, random sampling refers to the idea that proportion of classes in a training set for an AdaBoost instance is selected randomly. Then, SMOTE is used for augmenting data for a class having fewer samples, and random under-sampling is used for reducing the number of samples for a class having more data. Through these methods, the goal is to achieve the desired ratio between the class samples.

Shao et al. [12] presented Weighted Lagrangian Twin Support Vector Machine (WLTSVM) for dealing with binary classification of imbalanced data. A graph based under-sampling of the majority-class was presented to deal with imbalanced data. Furthermore, weighted bias was introduced to improve the performance of the class that has fewer samples. Maldonado and Lopez [13] presented a new second-order cone programming formulation for SVM to deal with classification of imbalanced data. The approach is based on cost sensitive learning, where cost of misclassifying samples of a minority class are higher than that of the majority class samples, and is performed separately for each class. Linear programming SVM formulation was adapted based on second-order cones and the problem was split into two margin variables.

Kang et al. [14] illustrated a Weighted Under-sampling SVM (WU-SVM) method based on space geometry distance. The key idea in WU-SVM, is to generate Sub-Regions (SRs) by grouping majority samples and assign weights to the majority samples within the SR based to their Euclidean distance to the SVM's decision plane. This is done in-order to retain the data distribution of the original data while under-sampling.

From the literature review, it can be seen that the presence of imbalanced data makes the classification problem a challenging task. Moreover, hidden outliers greatly deteriorate the performance of a classifier. There are many abnormal data in the practical industrial scenarios, most of which come from the sensor reading error or transmission error. Abnormal data that deviates significantly from normal values can be easily removed during data preprocessing. In Kang et al. [15], noise filters are combined with under-sampling technique in-order to handle noise in the minority class. But there is a kind of outliers hidden among normal data: they have normal values from the perspective of the overall data. However, in the view of one cluster, it locates far away from most of the data in the same cluster, which indicates that they are likely to be outliers. As shown in FIG. 1, take an imbalanced binary classification task as the example. The blue circles represent the 10 positive samples and the red plus signs represent the 100 negative ones. It is possible that two positive samples A and B and in the figure are outliers, because almost all of their neighbors are negative samples. Also, the negative sample C is likely to be an outlier since it is surrounded by positive samples. The existence of such outliers greatly affects the decision boundary in imbalanced classification because they can pull the decision boundary to a closer region such that maximum overall accuracy can be achieved. However, under this circumstance, more samples will be misclassified. The invention provides a method and system to improve the accuracy of unbalanced classification by detecting hidden anomalies and then remove true outliers and conceal fake outliers.

SUMMARY

In one embodiment of the invention, an AUC-maximized high-accuracy classification method and system for imbalanced datasets is described. In the method and system according to the invention, one imbalanced dataset (training data) is used for training a highly accurate MaxAUC classifier which is stored in a computer or computer system, and then a similar new dataset (test data) can be input to the trained computer or computer system, and hence corresponding classification results are obtained. In operation, the training method integrates an under-sampling-and-ensemble strategy, a true-outliers-removing strategy and a fake-outliers-concealing strategy, with the hope to effectively and robustly enhance both the AUC and the accuracy metrics in imbalanced classification. The invention advances the area of imbalanced classification in at least the following aspects:

1) Applying under-sampling to construct multiple sub-datasets and assembling classification results of multiple classifiers. The under-sampling of the majority samples transforms the original imbalanced dataset into multiple balanced sub-datasets. In each sub-dataset, the numbers of positive and negative samples are almost same, which greatly declines the risk of misclassification. Moreover, we obtain multiple classifiers based on these sub-datasets. The combination of different classifiers has better and robust performance than single classifier. Hence, under the under-sampling strategy and ensemble strategy, the results in imbalanced classification task are with high accuracy.

2) Removing hidden outliers in each sub-dataset. This invention pay attention to detect and identify extremely hidden outliers. Apart from applying basic outlier detection on the whole dataset or on each class (i.e., majority class and minority one), the method focuses on a sub-dataset which includes a sub-majority dataset and the entire minority dataset. In this way, more hidden outliers can be located and thus exert less influence on the decision boundary, which contributes to both high AUC and accuracy.

3) Concealing fake outliers when building decision boundary. Fake outliers are samples with high probability of being outliers but confirmed as normal samples. They interfere with the decision boundary and mislead it into a region where the distance from it to positive and negative samples is balanced, which leads to a high-ratio wrong classification of majority samples. This invention proposes to conceal these misleading samples when building decision boundary, so that we can achieve a higher classification accuracy of the majority class without changing that of the minority class.

DESCRIPTION OF THE DRAWINGS

FIG. 6a is a graph depicting two separate classes;

FIG. 6b is a graph showing the maximum margin criterion for SVM;

FIG. 7a is a graph showing two overlapping classes;

FIG. 7b is a graph showing the soft margin criterion for cSVM;

DETAILED DESCRIPTION

Figure 2:
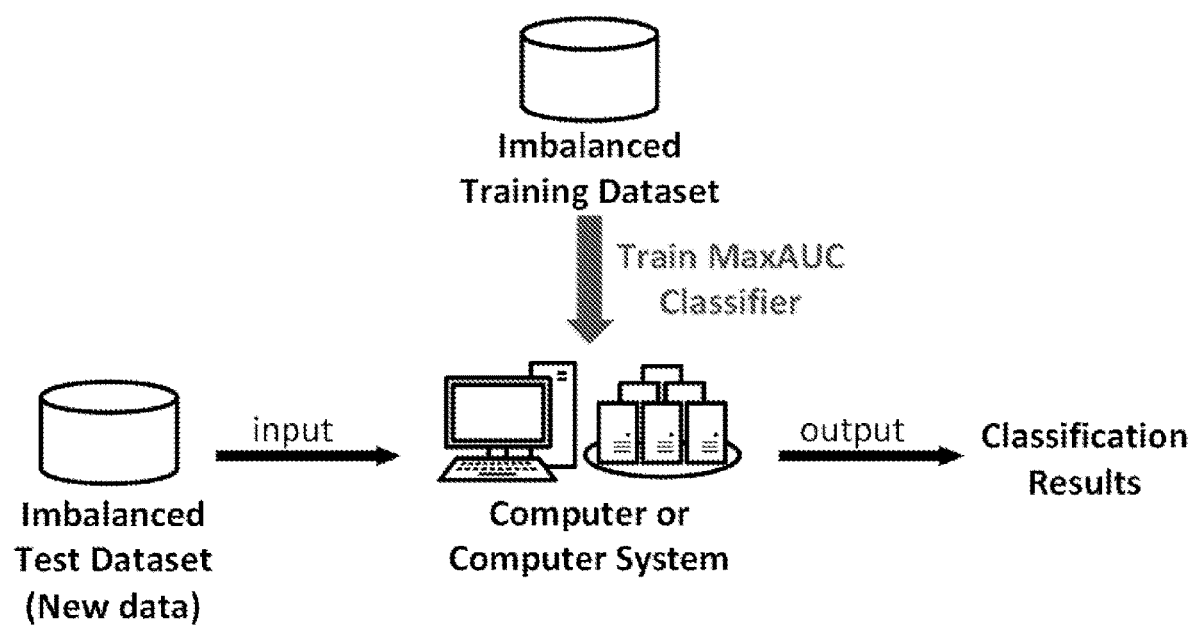
FIG. 2 is a graph showing the general framework of the training method in the invention.
Figure 3:
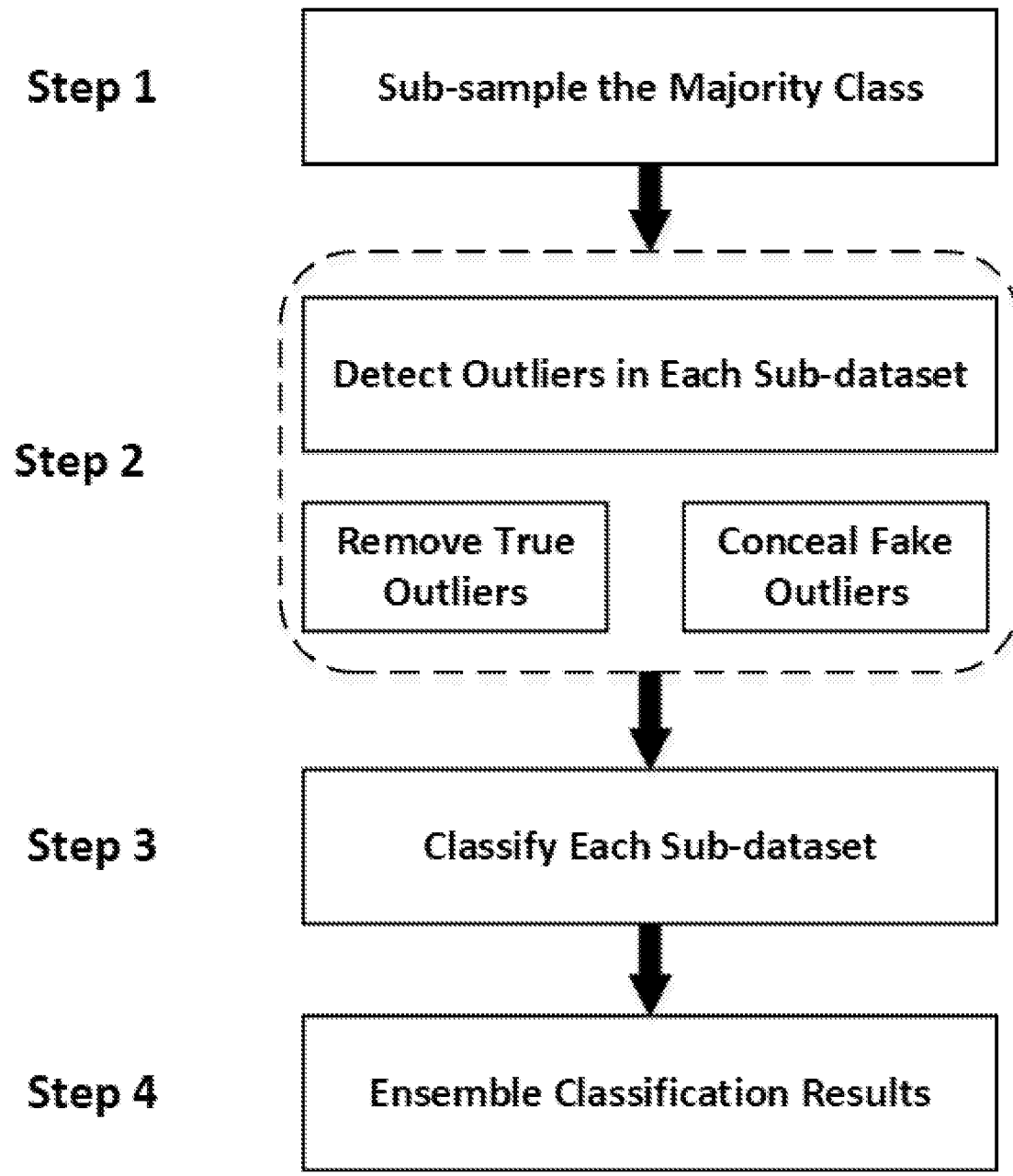
FIG. 3 is an illustration of steps in training method according to the invention.

The framework of an embodiment of the invention is shown in FIG. 2. The most important part is to train the MaxAUC classifier whose steps are depicted in FIG. 3. In detail, there are four steps in the method and system according to the invention. First, the invention under-samples the majority samples and constructs sub-datasets which consist of balanced positive and negative classes. Then, the invention checks and identifies hidden potential outliers in all sub-datasets before building decision boundary. Afterwards, the classification algorithm is applied to each pair of sub-majority samples and minority samples. At last, the classification results of every sub-dataset are ensembled as final output of the imbalanced classification task.

The method according to the invention is described as follows.

Step 1: Under-Sample the Majority Class

Figure 4:
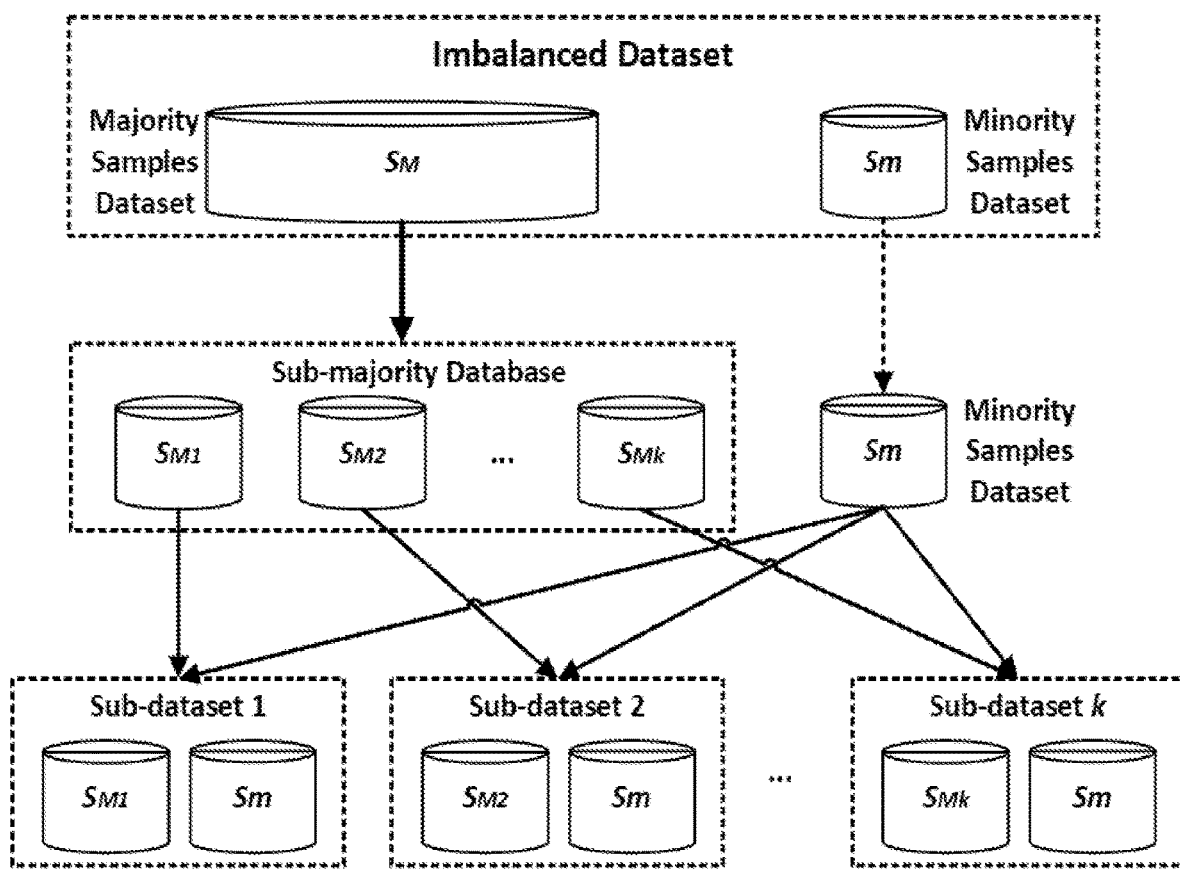
FIG. 4 is an illustration of under-sampling the majority class.

In this invention, the majority samples denoted as $S_M$ are clustered into k sub-majority classes, as shown in FIG. 4. Alternative clustering algorithms are K-means and DBSCAN. These k classes are denoted as $S_{M1}, S_{M2}, \ldots, S_{Mk}$. The selection of k is based on the numbers of minority samples $S_m$. It satisfies the two following constraints.

$$S_m \leq S_{Mi} \leq (1+\epsilon)S_m, i=1,2,\ldots,k, 0\leq\epsilon\leq 0.1 \quad (1)$$

$$\sum_{i=1}^{k} S_{Mi} = S_M \quad (2)$$

In this invention, $\epsilon$ in Eq (1) is selected as a number to between 0 and 0.1, which ensures that each sub-majority dataset has similar number of samples as a minority dataset does. In this way, the original imbalanced dataset is transformed into k pairs of balanced dataset $\{S_{M1},S_m\}, \{S_{M2},S_m\}, \ldots, \{S_{Mk},S_m\}$.

Step 2: Detect Outliers in Each Sub-Dataset

Figure 1:
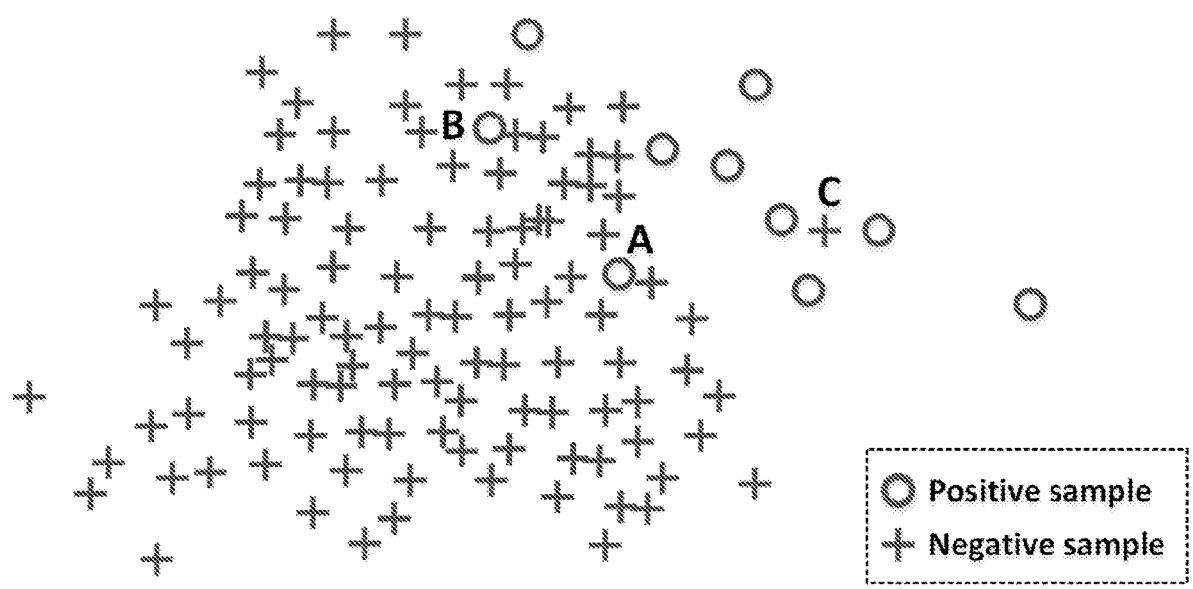
FIG. 1 is a graph showing an example of imbalanced binary classification dataset with outliers.
Figure 5:
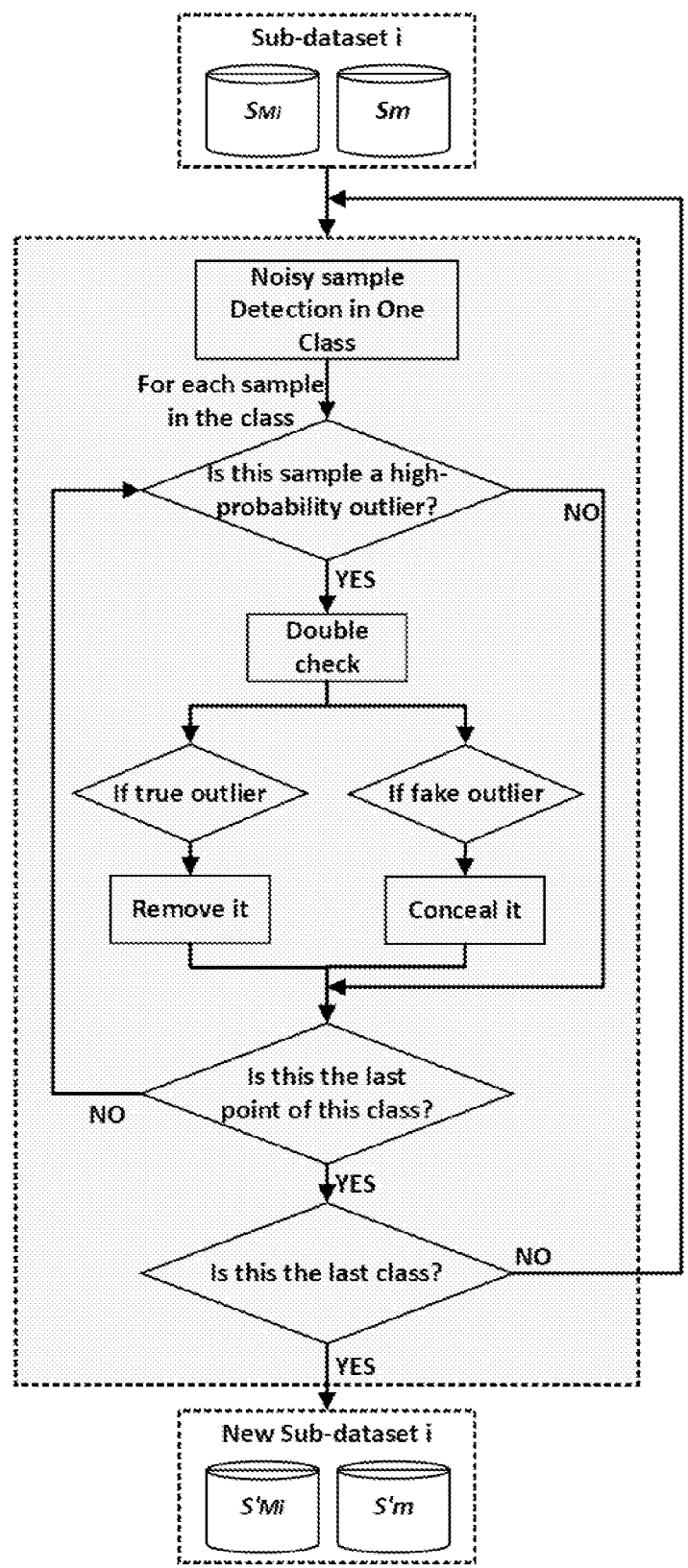
FIG. 5 is an illustration of detecting outliers in a sub-dataset.

According to FIG. 1, we are supposed to detect outliers hidden in other class. This invention proposes to apply outlier detection algorithm (e.g., KNN, DBSCAN, and LOF) on each pair of $\{S_{Mi},S_m\}(i=1, 2, \ldots, k)$. Details are shown in FIG. 5. For the sub-majority dataset $S_{Mi}(i=1, 2, \ldots, k)$, samples closed to minority samples in $S_m$ are assigned high probability of being outliers. Similarly, samples in minority dataset $S_m$ are regarded as highly potential outliers when they are surrounded by samples from $S_{Mi}$. After employing an anomaly detection on each sub-dataset, every sample obtains a probability of being outliers. Samples with high probability are evaluated again by experienced engineers with technical expertise. Then, true outliers are removed and fake outliers are concealed (The concealed samples do not participate in the training process but are counted during evaluation.) Thus we gain the renewed k sub-datasets $\{S'_{M1}, S'_m\}, \{S'_{M2},S'_m\}, \ldots, \{S'_{Mk},S'_m\}$ which are used for classification.

Step 3 Classify Each Sub-Dataset

After noisy samples are removed, we can use various classifiers on every sub-dataset $\{S'_{Mi},S'_m\}(i=1, 2, \ldots, k)$. One of them is maximized Area Under the Curve (maxAUC) linear SVM outlined as follows:

(1) Linear SVM

To simplify, consider classification data $(x_i,d_i)$ for $i\in\Omega$, containing two classes P and N, where $|\Omega|$ is the total observations, $d_i\in\{1,-1\}$ is class label, $x_i\in\mathbb{R}^F$ is the i-th data point in F-dimensions, $P\cup N=\Omega$ and $P\cap N=\emptyset$. Without loss of generality, let us say that $|P|\leq|N|$, $d_i=1$ iff $i\in P$, and $d_i=-1$ iff $i\in N$.

The basic idea of SVM is to separate two classes (say P and N) by a hyperplane defined as:

$$f(x)=w^t x+b \quad (1)$$

such that $f(x)<0$ when $x\in N$, and $f(x)\geq 0$ when $x\in P$. Obviously, there could be infinitely many possible choices to select (w,b) in the case of linearly separable classes. Among all these infinite choices, the goal of SVM is to choose (w,b) that minimizes the risk of misclassifying a new unlabeled data point. In other words, the aim is to find a hyperplane that is sufficiently far from both the classes. This can be realized by finding two parallel hyperplanes that separate the classes, such that the following properties are satisfied: the distance (or margin) between the hyperplanes is maximum, and there is no data point in between the hyperplanes. A classifier satisfying the above properties is called a maximum margin classifier. In order to build the maximum margin classifier, without loss of generality, consider the following two parallel hyperplanes:

$$w^t x+b=1 \quad (2)$$

$$w^t x+b=-1 \quad (3)$$

The distance between the supporting hyperplanes defined in (2) & (3) is given as:

$$\Delta = \frac{2}{\|w\|} \quad (4)$$

FIG. 6a shows two classes designated by "x" and by small circles. FIG. 6b depicts the notion of supporting hyperplanes and the maximum margin. In FIG. 6b the dashed line through the small circles and the dashed line through the x's are the hyperplanes, and the support vectors are the larger circles which encircle either the x's or the smaller circles. In order to achieve the maximum margin criterion, the following optimization problem is solved:

$$\text{maximize: } = \frac{2}{\|w\|} \quad (5a)$$

$$\text{subject to: } y_i(w^t x_i+b)-1\geq 0 \forall i\in\Omega \quad (5b)$$

The objective of (5) is replaced by minimizing $\frac{1}{2}\|w\|^2$, i.e., the above formulation is recast as:

$$\text{minimize: } \frac{1}{2}\|w\|^2 \quad (6a)$$

$$\text{subject to: } y_i(w^t x_i+b)-1\geq 0 \forall i\in\Omega \quad (6b)$$

The above formulations work very well when the data is linearly separable. However, data in most of the practical problems is imbalanced and overlapping. In order to extend the usability of SVMs for overlapping data, additional slack variables are introduced which capture the degree of overlap for some of the data points. This extended classifier is termed as a soft margin classifier, denoted as cSVM, and the changes are incorporated as follows:

$$\text{minimize: } \frac{1}{2}\|w\|^2 + c\sum_{i\in\Omega} s_i \quad (7a)$$

$$\text{subject to: } y_i(w^t x_i + b) - 1 + s_i \geq 0 \,\forall i \in \Omega \quad (7b)$$

$$s_i \geq 0 \,\forall i \in \Omega \quad (7c)$$

where $s_i \geq 0$ is a slack variable, and c is a parameter that reflects the cost of soft margin. FIG. 7 depicts the notion of a soft margin classifier.

(2) Logistic Regression

Figure 8:
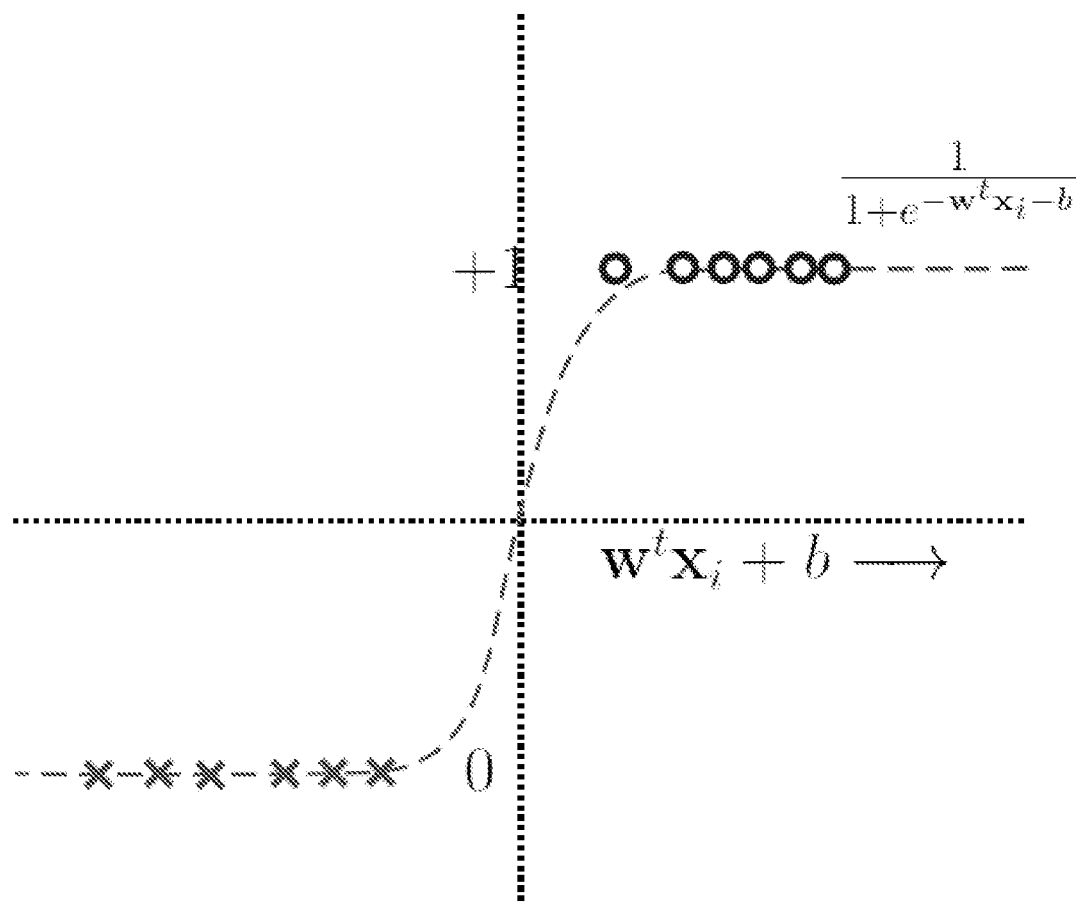
FIG. 8 is a graph showing the probability function of Logistic Regression.

When data from the two classes overlap, it is sometimes desirable to provide a probabilistic interpretation to the classification results in order to quantify the uncertainty of class labels during prediction. The basic idea of Logistic Regression (Log R) is to assign probabilities to each observation, defined as:

$$h(x_i) = \frac{1}{1 + e^{-w^t x_i - b}} \,\forall i \in \Omega \quad (8)$$

where $w \in \mathbb{R}^F$ and $b \in \mathbb{R}$. The aim of Log R is to choose (w,b) such that h(x)<0.5 when x∈N, and h(x)≥0.5 when x∈P. FIG. 8 depicts the probability function.

The optimization model of Log R can be written as:

$$\text{minimize: } \frac{1}{|\Omega|} \sum_{i\in\Omega} \left\| \frac{1}{1 + e^{-w^t x_i - b}} - \frac{d_i + 1}{2} \right\| \quad (9)$$

The above formulation is recast as:

$$\text{minimize: } \frac{1}{|\Omega|} \sum_{i\in\Omega} \xi\left( \frac{1}{1 + e^{-w^t x_i - b}}, \frac{d_i + 1}{2} \right) \quad (10)$$

where $\xi(\,)$ is a cost function or a measure of similarity.

(3) MaxAUC Criterion

In binary classification, there are four situations constituting the confusion matrix shown in TABLE I.

TABLE I

Confusion Matrix

|  |  | Actual Class | |
| --- | --- | --- | --- |
|  |  | Positive | Negative |
| Predicted Class | Positive | TP | FP |
|  | Negative | FN | TN |

In the confusion matrix, TP is the number of true positive samples that are actual positive samples and also be predicted correctly as positive; FP is the number of false positive samples that are actual negative samples but be predicted mistakenly as positive; FN is the number of false negative samples that are actual positive samples but be predicted mistakenly as negative; TN is the number of true negative samples that are actual negative samples and also be predicted correctly as positive.

Based on the confusion matrix, we have the following metrics for binary classification. Accuracy is defined as the percentage of correctly predicted results in the total sample, as follows:

$$\text{Accuracy} = \frac{TP + TN}{TP + TN + FP + FN} \quad (11)$$

Figure 9:
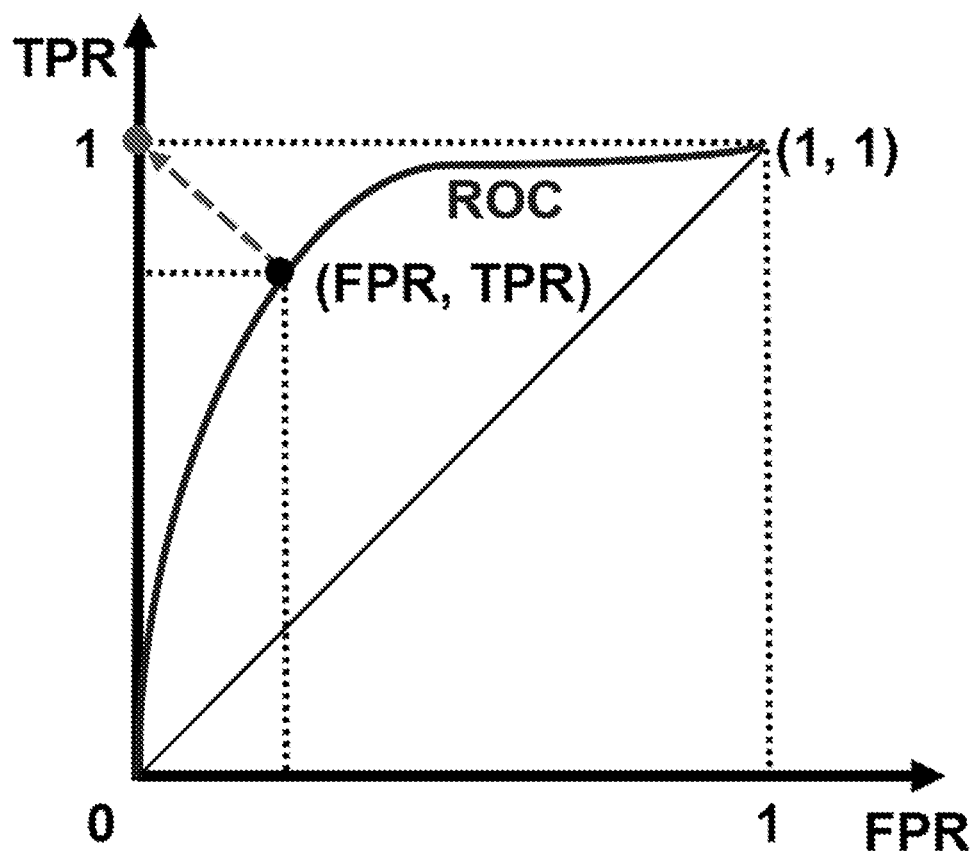
FIG. 9 is an illustration of the maxAUC criterion.

Although Accuracy can be used to measure the total accuracy rate, it is not a good indicator to measure the results in the case of imbalanced positive and negative samples. Take a simple example, there are positive samples accounting for 10% and negative samples accounting for 90% in a seriously unbalanced dataset. In this case, if we predict all the samples as positive samples, we can easily get a high accuracy of 90%. But in fact, all positive samples are misclassified. This shows that due to the imbalance of the samples, the high accuracy results are not always reliable. Accuracy works best if false positives and false negatives have similar cost. If the cost of false positives and false negatives are very different, it's better to look at the other indicators: Area Under the Curve (AUC). The curve is ROC (Receiver Operating Characteristics) curve. As shown in FIG. 9, the ROC curve is plotted with TPR against the FPR where TPR is on y-axis and FPR is on the x-axis. TPR (also named as Recall or Sensitivity) denotes the true positive rate, which is the ratio of the number of being predicted as positive samples to the total number of actual positive samples, which is written in (12). FPR denotes the false positive rate, which means the ratio of the number of false positive samples to the total number of actual negative samples, which is presented in (13).

$$TPR = \frac{TP}{TP + FN} \quad (12)$$

$$FPR = \frac{FP}{TN + FP} \quad (13)$$

For a classifier, we can get a pair of TPR and FPR according to its performance on the test sample. In this way, the classifier can be mapped to a point (TPR, FPR) on the ROC plane. By adjusting the threshold value of this classifier, we can get a curve passing through (0, 0), (1, 1), which is the ROC curve of this classifier. It is shown in FIG. 9 as a blue curve. In general, this curve should be above the line from (0, 0) to (1, 1), which actually represents the performance of a random classifier. AUC is the area under the ROC curve, which tells how good a model is capable of distinguishing between classes. The higher AUC, the better model at predicting 1s as 1s and −1s as −1s. An excellent model has its AUC value near 1, meaning that it has the excellent measure of separability. A poor model has AUC near 0, meaning that it has the poor measure of separability. It is predicting is as −1s and −1s as 1s. When AUC is 0.5, the model randomly separates a sample into two classes.

Similarly as with equations (12) and (13), we define true negative rate TNR (also named as Specificity) as the ratio of the number of being predicted as negative samples to the total number of actual negative samples, which is written as:

$$TNR = \frac{TN}{TN + FP} = 1 - FPR \quad (14)$$

The MaxAUC criterion is described in FIG. 9. The aim of the MaxAUC classifier is to push (FPR, TPR) as close to (0, 1) as possible. In MaxAUC, AUC is approximately calculated as:

$$AUC = 1 - \frac{1}{2}(1 - TPR) - \frac{1}{2}FPR = \frac{1}{2}(TPR + TNR) \quad (15)$$

Assume that the classes are separable. Since $y_i, d_i \in (1,-1)$, a classifier aims to obtain $y_i$ such that $y_i d_i = 1$ for $i \in P$, and $y_i d_i = 1$ for $i \in N$. To sum, a sample i is correctly classified, if and only if, $y_i d_i = 1$ for $i \in \Omega$.

Now, TPR can be estimated as $$\frac{1}{|P|}\sum_{i \in P} d_i y_i,$$

and TNR can be estimated as $$\frac{1}{|N|}\sum_{i \in N} d_i y_i.$$

Thus, AUC is proportional to:

$$\frac{1}{|N|}\sum_{i \in N} d_i y_i + \frac{1}{|P|}\sum_{i \in P} d_i y_i \quad (16)$$

Figure 10:
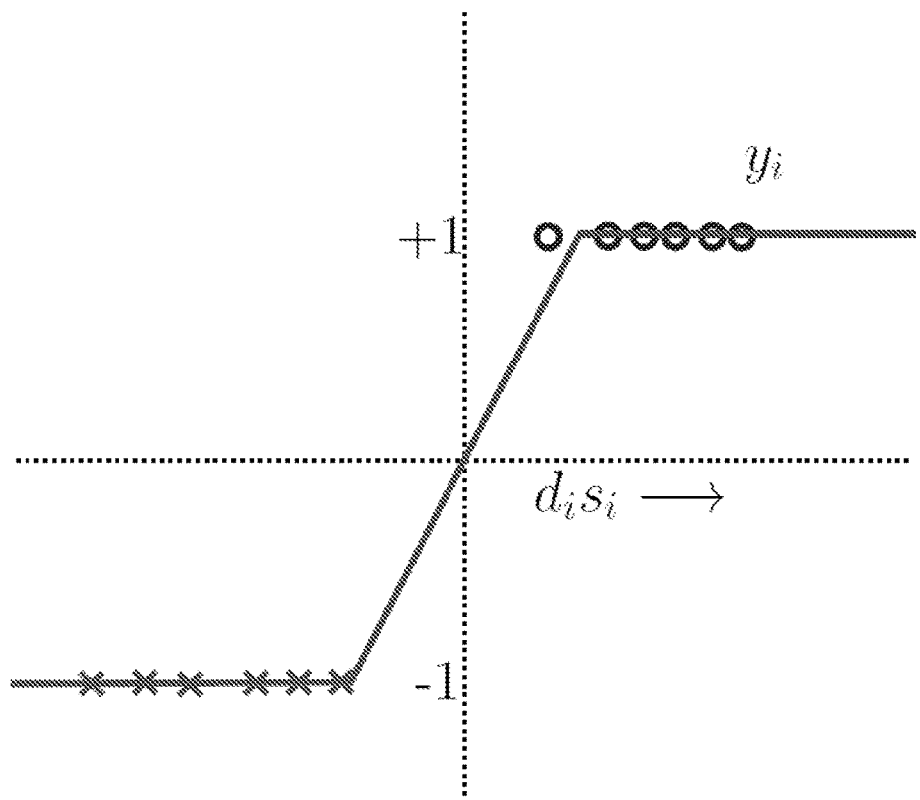
FIG. 10 is a graph showing the linear scaling function.

The following LP model can be used to achieve the maxAUC criterion:

$$\text{maximize:} \frac{1}{|N|}\sum_{i \in N} d_i y_i + \frac{1}{|P|}\sum_{i \in P} d_i y_i \quad (17a)$$

$$\text{subject to:} d_i(w^t x_i + b) - 1 + s_i \geq 0 \,\forall i \in \Omega, \quad (17b)$$

$$d_i y_i - 1 + s_i * D \leq 0 \,\forall i \in \Omega, \quad (17c)$$

$$y_i \leq 1 \,\forall i \in \Omega, \quad (17d)$$

$$y_i \geq 1 \,\forall i \in \Omega, \quad (17e)$$

$$s_i \geq 0 \,\forall i \in \Omega \quad (17f)$$

where $y, s \in \mathbb{R}^\Omega$, $w \in \mathbb{R}^F$ and $b \in \mathbb{R}$ are the variables. In addition to that, D is a constant that is estimated from the data points. The objective function in (17a) is designed to achieve the maxAUC criterion. Similar parameters and variables are used to compare and contrast the proposed model with SVM and Log R. Constraint (17b) and (17f) are similar to the soft margin constraint. Furthermore, Constraints (17c) to (17e) linearly scales the predicted class labels, which is similar to Log R. FIG. 10 depicts a linear scaling function.

To sum, the maxAUC linear SVM combines the characteristics of SVM and Log R, and aims towards improving AUC which is usually more useful than Accuracy, especially for an uneven class distribution.

After applying maxAUC linear SVM on every sub-dataset, we gain k classifiers $C_1, C_2, \ldots, C_k$.

Step 4 Ensemble Classification Results

Based on the k classifiers $C_1, C_2, \ldots, C_k$, we obtain k prediction results for sample x. Generally, the principle of majority voting is used in determining the ensembled classification results ŷ. Namely, the result predicted by most classifiers is regarded as the final class label. That is $$\hat{y} = \text{mode}(C_1(x), C_2(x), \ldots, C_k(x))$$

where mode( ) outputs the value that is repeated most often in the data set.

If we mark the positive samples as 1 and mark the negative ones as −1. The ensembled results can be written as $$\hat{y} = \text{sign}\left[\sum_{i=1}^{k} C_i(x)\right] = \begin{cases} 1, & \text{if } \sum_{i=1}^{k} C_i(x) \geq 0 \\ -1, & \text{other} \end{cases}$$

where sign[•] function is to take the sign (positive or negative) of a number.

EXAMPLE

Figure 11:
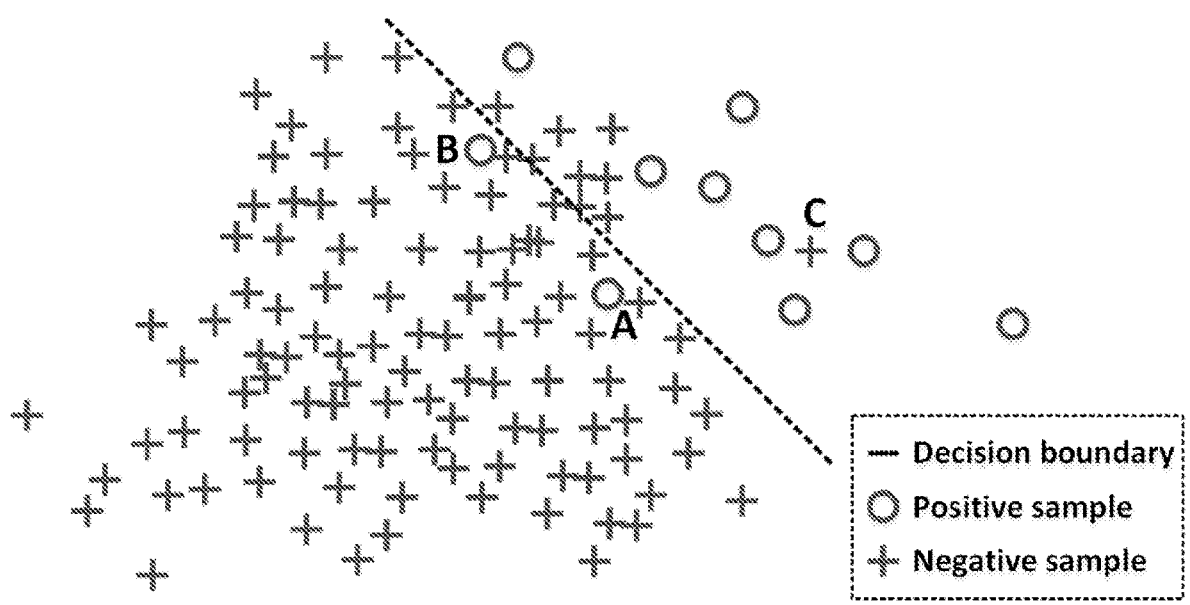
FIG. 11 is a graph showing the decision boundary without applying outlier detection.

Take the task in FIG. 1 as an example. There are 10 positive samples denoted as blue circles and 100 negative ones denoted as red plus signs. If we do not apply anomaly detection and not remove them, the decision boundary based on the original database is shown in FIG. 11. The existence of far-away A and B pull the decision boundary closer to them during a training process, which causes many negative samples falling into the positive plane. Hence, the false positive rate is high under this situation. In imbalanced classification, higher TPR and lower FPR indicate better classification. As shown in TABLE II, when not applying outlier detection, we obtain TPR of 80% and FPR of 9%. Consequently, AUC is 0.855 and Accuracy is 90%.

TABLE II (a) Confusion Matrix Without Applying Outlier Detection

| | | Actual Class | |
|---|---|---|---|
| | | Positive | Negative |
| Predicted Class | Positive | 8 | 2 |
| | Negative | 9 | 91 |

(b) Main Performance Metrics Without Applying Outlier Detection

| Metrics | TPR | FPR | AUC | Accuracy |
|---|---|---|---|---|
| Values | 80% | 9% | 0.855 | 90% |

Figure 12:
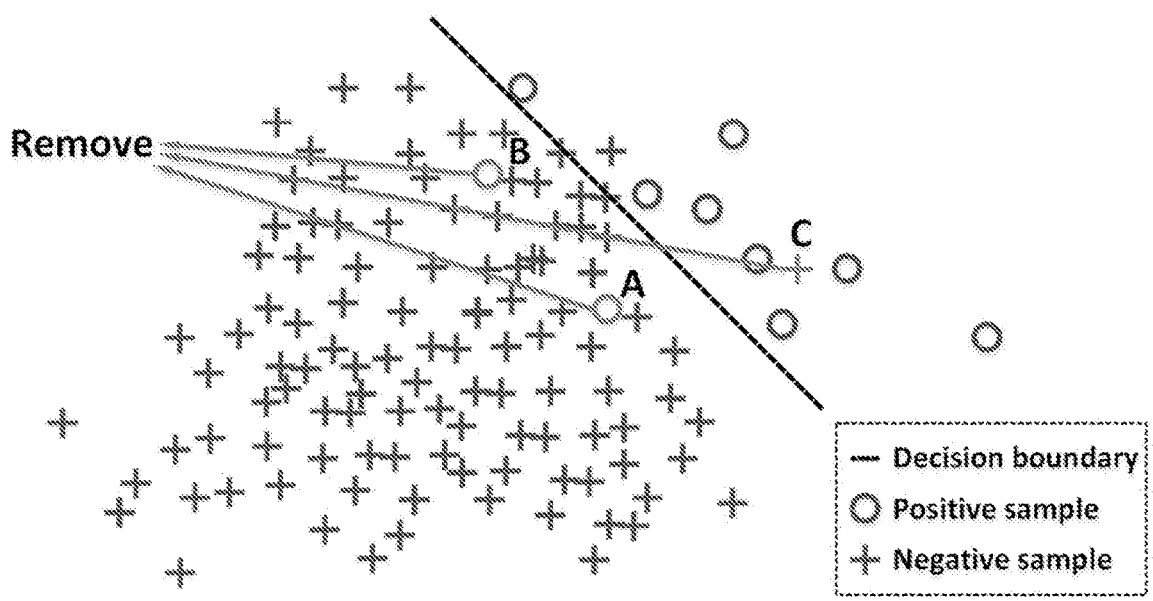
FIG. 12 is a graph showing the decision boundary after removing true outliers.

In an embodiment of the invention, samples A and B are regarded as high-probability outliers. Further identification is left to experienced engineers who can provide a second detection based on their expertise and evaluate these potential outliers from a more practical perspective. After double outlier detections, there are two situations:

(1) They are outliers. If samples A and B are outliers which include wrong data, they are removed as shown in FIG. 12. Then, a decision boundary for the rest data points is obtained. Intuitively, the classification accuracy for each class is enhanced. Without samples A and B, there is less overlap between positive and negative classes. Thus, the decision boundary can achieve more accurate classification, especially for the negative class. As shown in TABLE III, we obtained higher TPR which is 100% and lower FPR which is only 1.01% after removing outliers. Moreover, we achieve an AUC of 0.995 which is improved by 0.14 compared with no outlier detection. Also, the Accuracy metric is improved by 9.1%. After removing true outliers, we gain a high Accuracy of 99.1%.

TABLE III (a) Confusion Matrix after Removing True Outliers

|  |  | Actual Class | |
| --- | --- | --- | --- |
|  |  | Positive | Negative |
| Predicted Class | Positive | 8 | 0 |
|  | Negative | 1 | 98 |

(b) Main Performance Metrics after Removing True Outliers

| Metrics | TPR | FPR | AUC | Accuracy |
| --- | --- | --- | --- | --- |
| Values | 100% | 1.01% | 0.995 | 99.1% |

Figure 13:
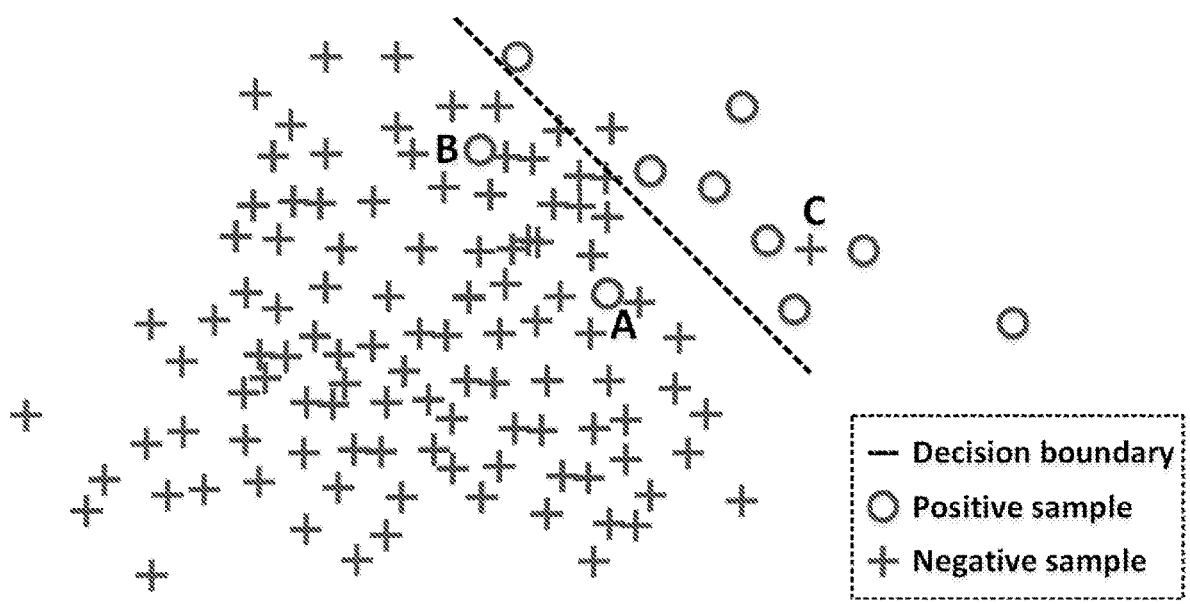
FIG. 13 is a graph showing the decision boundary after concealing fake outliers.

(2) They are not outliers. However, due to their existence, the classification algorithm tends to close the classification boundary to them. This greatly compromises the classification accuracy of negative classes. Moreover, in the imbalanced classification task, the negative data are the majority. The slight movement of a decision boundary causes a large number of negative samples to be misclassified. Especially for the positive samples in the neighborhood of negative samples in FIG. 13, they have a great influence on the decision boundary and lead to a higher FPR. Hence, the invention proposes to use the rest data (the original data after removing such samples) to determine the decision boundary, so as to maximize the ratio of correct classification of negative samples. Therefore, we can get the decision boundary in FIG. 13, and its performance metrics are shown in TABLE IV. We find that FPR decreases to 2% without affecting TPR metric which is still 80%. However, AUC is enhanced to 0.89 after concealing fake outliers. We also achieve high Accuracy of 96.4%, which is improved by 6.4%.

TABLE IV (a) Confusion Matrix after Concealing Fake Outliers

|  |  | Actual Class | |
| --- | --- | --- | --- |
|  |  | Positive | Negative |
| Predicted Class | Positive | 8 | 2 |
|  | Negative | 2 | 98 |

(b) Main Performance Metrics after Concealing Fake Outliers

| Metrics | TPR | FPR | AUC | Accuracy |
| --- | --- | --- | --- | --- |
| Values | 80% | 2% | 0.89 | 96.4% |

REFERENCES

[1] H. Han, W.-Y. Wang, and B.-H. Mao, "Borderline-SMOTE: a new over-sampling method in imbalanced data sets learning," in *International conference on intelligent computing*, 2005, pp. 878-887.
[2] N. V. Chawla, K. W. Bowyer, L. O. Hall, and W. P. Kegelmeyer, "SMOTE: synthetic minority over-sampling technique," *J. Artif. Intell. Res.*, vol. 16, pp. 321-357, 2002.
[3] C. F. Costa and M. A. Nascimento, "Ida 2016 industrial challenge: Using machine learning for predicting failures," in *International Symposium on Intelligent Data Analysis*, 2016, pp. 381-386.
[4] E. Peruffo, "Improving predictive maintenance classifiers of industrial sensors' data using entropy. A case study," PhD Thesis, Dublin, National College of Ireland, 2018.
[5] S. Rafsunjani, R. S. Safa, A. Al Imran, M. S. Rahim, and D. Nandi, "An Empirical Comparison of Missing Value Imputation Techniques on APS Failure Prediction," *IJ Inf. Technol. Comput. Sci.*, vol. 11, no. 2, pp. 21-29, 2019.
[6] G. D. Ranasinghe and A. K. Parlikad, "Generating real-valued failure data for prognostics under the conditions of limited data availability," in *2019 IEEE International Conference on Prognostics and Health Management (ICPHM)*, 2019, pp. 1-8.
[7] M. M. Akarte and N. Hemachandra, "Predictive Maintenance of Air Pressure System using Boosting Trees: A Machine Learning Approach," in *51st Annual Convention of ORSI and International Conference*, 2018.
[8] S. Ertekin, J. Huang, L. Bottou, and L. Giles, "Learning on the border: active learning in imbalanced data classification," in *Proceedings of the sixteenth ACM conference on Conference on information and knowledge management*, 2007, pp. 127-136.
[9] H. M. Nguyen, E. W. Cooper, and K. Kamei, "Borderline over-sampling for imbalanced data classification," *Int. J. Knowl. Eng. Soft Data Paradig.*, vol. 3, no. 1, pp. 4-21, 2011.
[10] S. Oh, M. S. Lee, and B.-T. Zhang, "Ensemble learning with active example selection for imbalanced biomedical data classification," *IEEE/ACM Trans. Comput. Biol. Bioinform.*, vol. 8, no. 2, pp. 316-325, 2010.
[11] J. F. Diez-Pastor, J. J. Rodriguez, C. Garcia-Osorio, and L. I. Kuncheva, "Random balance: ensembles of variable priors classifiers for imbalanced data," *Knowl.-Based Syst.*, vol. 85, pp. 96-111, 2015.
[12] Y.-H. Shao, W.-J. Chen, J.-J. Zhang, Z. Wang, and N.-Y. Deng, "An efficient weighted Lagrangian twin support vector machine for imbalanced data classification," *Pattern Recognit.*, vol. 47, no. 9, pp. 3158-3167, 2014.
[13] S. Maldonado and J. Lopez, "Imbalanced data classification using second-order cone programming support vector machines," *Pattern Recognit.*, vol. 47, no. 5, pp. 2070-2079, 2014.
[14] Q. Kang, L. Shi, M. Zhou, X. Wang, Q. Wu, and Z. Wei, "A distance-based weighted undersampling scheme for support vector machines and its application to imbalanced classification," *IEEE Trans. Neural Netw. Learn. Syst.*, vol. 29, no. 9, pp. 4152-4165, 2017.
[15] Q. Kang, X. Chen, S. Li, and M. Zhou, "A noise-filtered under-sampling scheme for imbalanced classification," *IEEE Trans. Cybern.*, vol. 47, no. 12, pp. 4263-4274, 2016.

The invention claimed is:
1. An AUC-maximized high-accuracy classification method for imbalanced datasets composed of a majority samples dataset and a minority samples dataset, comprising the steps of:
under-sampling of the majority samples dataset to produce k clusters of sub-majority datasets,
combining the minority samples dataset with each of the k clusters of sub-majority datasets to transform an original imbalanced dataset into multiple balanced sub-datasets, detecting outliers in each balanced sub-dataset,
categorizing the detected outliers into a first category consisting of samples which user input has identified as outliers and a second category of outliers consisting of samples which the user input has not identified as outliers;
removing outliers of the first category from training data and validation data of each balanced sub-dataset,
removing outliers of the second category from only the training data of each balanced sub-dataset,
building an AUC-maximized decision boundary between majority samples and minority samples of each sub-dataset, and
assembling above k MaxAUC classifiers as the final classifier which achieves a higher classification accuracy of the majority samples dataset without changing that of the minority samples dataset.

2. The AUC-maximized high-accuracy classification method for imbalanced datasets of claim 1, wherein the steps of under-sampling and combining produces multiple balanced sub-datasets in which the numbers of positive and negative samples are about the same.

3. The AUC-maximized high-accuracy classification method for imbalanced datasets of claim 1, wherein each classifier for the sub-dataset is based on the criterion of maximizing AUC.

4. A machine learning based system, comprising:
a computer or computer system trained by an AUC-maximized high-accuracy classification method for imbalanced datasets composed of a majority samples dataset and a minority samples dataset, wherein training comprises the steps of:
under-sampling of the majority samples dataset to produce k clusters of sub-majority datasets,
combining the minority samples dataset with each of the k clusters of sub-majority datasets to transform an original imbalanced dataset into multiple balanced sub-datasets,
detecting outliers in each balanced sub-dataset,
categorizing the detected outliers into a first category consisting of samples which user input has identified as outliers and a second category of outliers consisting of samples which the user input has not identified as outliers;
removing outliers of the first category from training data and validation data of each balanced sub-dataset,
removing outliers of the second category from only the training data of each balanced sub-dataset,
building an AUC-maximized decision boundary between majority samples and minority samples of each sub-dataset, and
assembling above k MaxAUC classifiers as the final classifier which achieves a higher classification accuracy of the majority samples dataset without changing that of the minority samples dataset; and
inputs to and outputs from the computer or computer system.

* * * * *